US006800848B2

(12) United States Patent
Shiokawa et al.

(10) Patent No.: US 6,800,848 B2
(45) Date of Patent: Oct. 5, 2004

(54) METHOD AND APPARATUS FOR ION ATTACHMENT MASS SPECTROMETRY

(75) Inventors: Yoshiro Shiokawa, Hachioji (JP); Megumi Nakamura, Fuchu (JP); Tohru Sasaki, Fuchu (JP); Toshihiro Fujii, Hamura (JP)

(73) Assignee: Anelva Corporation, Tokyo (JP)

( * ) Notice: Subject to any disclaimer, the term of this patent is extended or adjusted under 35 U.S.C. 154(b) by 13 days.

(21) Appl. No.: 09/870,736

(22) Filed: Jun. 1, 2001

(65) Prior Publication Data

US 2001/0048074 A1 Dec. 6, 2001

(30) Foreign Application Priority Data

Jun. 6, 2000 (JP) ........................................ 2000-169644

(51) Int. Cl.[7] .................................................. B01D 59/44
(52) U.S. Cl. ........................................................ 250/282
(58) Field of Search ................................. 250/281, 282, 250/286, 289; 73/23.36, 23.37

(56) References Cited

U.S. PATENT DOCUMENTS

| | | | | |
|---|---|---|---|---|
| 4,652,752 A | * | 3/1987 | Ino et al. | 250/281 |
| 4,948,962 A | * | 8/1990 | Mitsui et al. | 250/288 |
| 5,889,281 A | * | 3/1999 | Holkeboer et al. | 250/282 |
| 5,962,774 A | * | 10/1999 | Mowry et al. | 73/23.37 |
| 6,324,892 B1 | * | 12/2001 | Nishina et al. | 73/23.2 |

FOREIGN PATENT DOCUMENTS

JP A 6-11485 1/1994

OTHER PUBLICATIONS

Lindon, Encyclopedia of Spectroscopy and Spectrometry 2000, Academic Press, pp. 1241–1248.*

Hodges et al., "Aplication of Alkali Ions in Chemical Ionization Mass Spectrometry", Analytical Chemistry, vol. 48, No. 6, May 1976, pp. 825–829.

Bombick et al., "Potassium Ion Chemical Ionization and Other Uses of an Alkali Thermionic Emitter in Mass Spectrometry", Analytical Chemistry, vol. 56, No. 3, 1984, pp. 396–402.

Fujii et al., "Chemical Ionziation Mass Spectrometry with Lithium Ion Attachment to the Molecule", Analytical Chemistry, vol. 61, No. 9, 1989 pp. 1026–1029.

Fujii, "A novel method for detection of radical species in the gas phase: usage of Li=ion attachment to chemical species", Chemical Physics Letters, vol. 191, No. 1, 1992, pp. 162–168.

* cited by examiner

*Primary Examiner*—Lamson Nguyen
*Assistant Examiner*—Blaise Mouttet
(74) *Attorney, Agent, or Firm*—Oliff & Berridge, PLC

(57) ABSTRACT

An apparatus for ion attachment mass spectrometry provided with a reaction chamber for causing positively charged metal ions to attach to a gas to be detected; a mass spectrometer for mass separation and detection of the detection gas; an analysis chamber in which the mass spectrometer is placed; differential evacuation chambers for connecting the reaction chamber and analysis chamber; a data processor for receiving and processing the mass signal from the mass spectrometer; and vacuum gauges for measuring the total pressure of the reduced pressure atmosphere of the reduced pressure atmosphere reaction chamber, a differential evacuation chamber, and an analysis chamber. The total pressure signal from the vacuum gauge measured during the measurement is input to one of the data processor, introduction mechanism, and evacuation mechanism. The data processor has a processing means for performing quantitative analysis of each component utilizing the fact that sensitivity of each component has dependency on the total pressure of the reduced pressure atmosphere and that the dependency on total pressure differs for each component.

16 Claims, 10 Drawing Sheets

DEPENDENCY OF SENSITIVITY ON TOTAL PRESSURE OF REACTION CHAMBER

DEPENDENCY OF SENSITIVITY ON TOTAL PRESSURE OF REACTION CHAMBER

DEPENDENCY OF SENSITIVITY ON TOTAL PRESSURE OF DIFFERENTIAL EVACUATION CHAMBER

PRIOR ART

PRIOR ART

PRIOR ART

METHOD AND APPARATUS FOR ION ATTACHMENT MASS SPECTROMETRY

BACKGROUND OF THE INVENTION

1. Field of the Invention

The present invention relates to a method and apparatus for ion attachment mass spectrometry used for a quantitative analysis for accurately measuring the concentration of a gas to be detected.

2. Description of the Related Art

An ion attachment mass spectrometer is a mass spectrometer designed to accurately measure the molecular weight of the gas to be detected. The analysis executed by this apparatus enables ionization and mass spectrometry of the detection gas without causing cracking. The ion attachment mass spectrometer has been reported in Hodge, *Analytical Chemistry*, vol. 48, no. 6, p. 825 (1976); Bombick, *Analytical Chemistry*, vol. 56, no. 3, p. 396 (1984); and Fujii et al., *Analytical Chemistry*, vol. 1, no. 9, p. 1026 (1989), *Chemical Physics Letters*, vol. 191, no. 1.2, p. 162 (1992), and Japanese Unexamined Patent Publication (Kokai) No. 6-11485.

The conventional ion attachment mass spectrometers will be explained referring to the drawings.

FIG. 9 shows the apparatus proposed by Fujii. In FIG. 9, 901 indicates a reaction chamber, 902 a first differential evacuation chamber, 903 a second differential evacuation chamber, 904 an analysis chamber, 905 a gas introduction mechanism, 906 an evacuation mechanism, and 907 a data processor. Further, 911 indicates an emitter, 912 a first aperture, 913 a reaction chamber seal, 914 a reaction chamber vacuum gauge, and 915 a baking mechanism. Further, 921 indicates a second aperture, 922 a partition of the first differential evacuation chamber, 931 a third aperture, 932 a partition of the second differential evacuation chamber, 933 an electrostatic lens, and 941 a Q-pole mass spectrometer. Further, 951 indicates a space to be measured, 952 a pipe, and 953 a flow rate adjustment valve. Reference numeral 961 indicates a first differential evacuation chamber wet pump, 962 a second differential evacuation chamber wet pump, and 963 an analysis chamber wet pump.

The reaction chamber 901, the first differential evacuation chamber 902, the second differential evacuation chamber 903, and the analysis chamber 904 form a vacuum chamber, that is, a chamber of a reduced pressure atmosphere being not more than atmospheric pressure. In the reaction chamber 901, an oxide of an alkali metal of an emitter is heated to cause the emission of $Li^+$ and other positively charged metal ions. The detection gas is introduced into the reaction chamber 901. The metal ions gradually attach to (associate with) locations where the charges of the gas molecules concentrate and the molecules as a whole are ionized. The excess energy at the time of attachment is an extremely small 0.435 to 1.304 eV/molecule and there is less occurrence of disassociation.

Since the excess energy is low, however, if left as it is, the $Li^+$ ends up being detached from the molecules again, so the total pressure of the reaction chamber 901 is made about 100 Pa to absorb the excess energy due to the large number of collisions. The gas absorbing the excess energy is neither the attaching ions or gas to be attached to, so is normally called a “third component gas”.

The third component gas may also be the detection gas itself, but normally a low reactivity $N_2$ gas etc. is used.

Further, as the third component gas, there are sometimes cases of a base gas containing the detection gas from the start in the measurement space (carrier gas) or gas separately introduced by the reaction chamber 901. Due in part to contamination and other reasons, since the partial pressure of the detection gas introduced is normally not more than 1 Pa, almost all of the total pressure of the reaction chamber 901 of about 100 Pa becomes the partial pressure of the third component gas.

The gas molecules (ions) to which the metal ions are stably attached pass through the opening of the aperture and enter the first differential evacuation chamber 902. The first differential evacuation chamber 902 functions to connect in vacuum the reaction chamber 901 which should be set at about 100 Pa and the analysis chamber 904 which should be set at not more than $1\times10^{-3}$ Pa. This results in a total pressure of 0.1 to 10 Pa in the first differential evacuation chamber 902. The electrostatic lens 933 is provided in the second differential evacuation chamber 903. The ions are condensed and enter the analysis chamber 904. The Q-pole mass spectrometer 941 placed in the analysis chamber 904 breaks down and detects the entering ions for each mass of the gas molecules (ions) by electromagnetic force. The Q-pole mass spectrometer 941 outputs a mass signal showing the intensity for each mass number to the data processor 907. Note that the pressure inside the analysis chamber 904 has to be maintained at not more than $1\times10^{-3}$ Pa in order to operate the Q-pole mass spectrometer 941 normally.

FIG. 10 shows the apparatus proposed by Bombick, while FIG. 11 shows the apparatus proposed by Hodge. In FIG. 10 and FIG. 11, components substantially the same as those explained in FIG. 9 are given the same reference numerals. In the apparatus shown in FIG. 10, the reaction chamber 901 is arranged in the first differential evacuation chamber 902. The total pressure of the reaction chamber 901 is not measured. In the apparatus shown in FIG. 11 as well, the reaction chamber 901 is placed in the first differential evacuation chamber 902, but in this case the total pressure of the reaction chamber 901 is measured. Since a long pipe 970 is extended from the reaction chamber 901 and the vacuum gauge 914 attached, accurate measurement of the total pressure is difficult. The rest of the configuration is the same as explained above.

The ion attachment mass spectrometers have been developed as modifications of the chemical ionization mass spectrometers (CIMS) designed for measurement of the molecular weight of the detection gas. In the CIMS, a methane or another reaction gas is ionized by the electron impact to ionize the detection gas to positive charges or negative charges by an ion-molecule reaction. The mechanism of ionization is extremely complicated. Phenomena such as (1) hydrogen ion bonding of the reaction gas, (2) hydrogen ion draining from the detection gas, and (3) charge movement occur. The bonding energy in the case of hydrogen ion bonds is so large as to be 6.957 to 8.696 eV/molecule, and therefore dissociation often ends up occurring. Peaks of the molecular ions are sometimes observed depending on the type of gas.

Originally, the CIMS was designed for measurement of the molecular weight of the detection gas, that is, “qualitative analysis” for obtaining information on “what are the compositions”. Therefore, the ion attachment mass spectrometer is confirmed to be effective for the qualitative analysis of organic substances or radicals. The ion attachment mass spectrometer, however, suffers from problems such as the stability of the mass signal and therefore is not used at all in industry for the qualitative analysis.

Analysis going further from the qualitative analysis and obtaining information on "what kind of composition is present in what amount" is called "quantitative analysis". Due to the following reasons, however, the ion attachment mass spectrometers have not been used for the quantitative analysis at all.

First, the quantitative analysis will be explained. In the quantitative analysis, four factors are important: (1) the applicable samples, (2) the signal-to-noise ratio, (3) the signal stability, and (4) the background (interference peaks). The "applicable samples" is the extent of the types of the samples which can be applied, the "signal-to-noise ratio" is the ratio of the mass signal (peak height) and noise (amount of fast cycle fluctuation of base level), the "signal stability" is the reproducibility of the mass signal, and the "background (interference peaks)" is the peaks not inherently present which change the apparent mass signal (peak height).

At the present, electron impact mass spectrometers (EIMS) and atmosphere pressure ion mass spectrometers (APIMS) are being used for the quantitative analysis.

With the EIMS, the applicable samples are good, but there are problems in the signal-to-noise ratio or the background (interference peaks). That is, the vacuum ultraviolet light from the gas receiving the electron impact becomes a cause of noise, so even if the mass signal is increased by, for example, increasing the electron current, the amount of noise will also end up increasing and as a result the signal-to-noise ratio will not be improved much at all. Further, fragment peaks resulting from cracking due to the electron impact easily become the interference peaks.

On the other hand, with the APIMS, the signal-to-noise ratio is good, but there are problems in the signal stability or background (interference peaks). That is, since a corona discharge is used at an atmospheric pressure, it is difficult to secure the stability. The clusters occurring due to the ion-molecule reactions at the atmospheric pressure easily became the interference peaks.

As opposed to the EIMS and APIMS, with the CIMS, there were problems with all four of the above factors. Therefore, this spectrometer is not being used much at all for the quantitative analysis. Since the conventional IAMS, like the CIMS, it had problems in the four factors, it was not used for the quantitative analysis.

Next, an explanation will be made of the background (interference peaks) and the vacuum technology relating to it.

In an ideal evacuation process, it is known that the pressure is reduced by the exponential function $e^{-1}$. The value (V/S) of the evacuated volume (V) divided by the pumping speed (S) is defined as the "evacuation time constant". When a time corresponding to the evacuation time Constant elapses, the pressure falls to 37 percent of or $e^{-1}$. After the elapse of five times that amount of time, the pressure falls to 1 percent or $e^{-5}$. Therefore, the evacuation time constant at the reaction chamber 901 corresponds to the response of measurement and determines by what extent of delay the change in concentration of the detection gas in the reaction chamber 901 tracks the change in concentration in the detection space.

The pumping speed controlling the evacuation time constant becomes the substantive pumping speed determined by the pumping speed of the vacuum pump itself and the conductance of the pipes etc. in the middle, that is, the effective pumping speed. In the conventional ion attachment mass spectrometer, the vacuum pump was not directly attached to the reaction chamber. Evacuation was performed through an opening of the aperture member. With this type, the effective pumping speed for the reaction chamber is greatly influenced by the conductance of the opening. The conductance of the opening is proportional to the opening area, so when the opening area is small, the effective pumping speed becomes small and the evacuation time constant becomes larger. In the conventional ion attachment mass spectrometer, however, since the aperture member having a relatively large opening area was used, the spectrometer had a relatively fast response defined by the evacuation time constant being not more than 1 second.

With the conventional ion attachment mass spectrometer of the related art, however, there was another problem of the gas dwelling in the reaction chamber 901. Even after the evacuation time constant sufficiently passed, the gas was not completely replaced and therefore the phenomenon of previous hysteresis remaining (memory effect) occurred. The property of the apparatus controlling the memory effect can be evaluated in the following way as the "dwell rate" of the gas. The "dwell rate" is defined by the ratio of the previous gas remaining (residual ratio) at the time that a time equivalent to five times the evacuation time constant elapses when changing the gas introduced into the reaction chamber to a different gas instantaneously. To eliminate this effect of the evacuation time constant, however, the value of the actually measured residual ratio minus 1 percent ($=e^{-5}$) is defined as the accurate dwell rate.

The total pressure of the reaction chamber 901 of the ion attachment mass spectrometer is normally made about 100 Pa, but with the total pressure, the flow of the gas becomes viscous, the gas molecules collide with each other, and the flow becomes like that of a gentle river overall. Therefore, if there are corners or depressions in the reaction chamber 901, pockets of flow will be created there and the dwell rate will end up increasing. In the conventional ion attachment mass spectrometer designed for the qualitative analysis, however, the dwell rate was not a problem, so there were many corners or depressions in the reaction chamber 901. Note that the ionization chamber for the EI has a pressure of $1\times10^{-3}$ Pa or so, so a molecular flow results. The gas molecules collide with only the walls and diffuse randomly, so there is now clear flow as a whole and even if there are the corners or depressions, dwelling does not occur.

Vacuum pumps can be roughly divided into "wet pumps" using an oil working fluid and "dry pumps" not using the oil working fluid. The "working fluid" is a fluid for driving the evacuation operation. Normally, oil is used. The wet pumps include, for high pressure use, oil rotary pumps (RP) and, for low pressure use, oil diffusion pumps (DP). The dry pumps include, for high pressure use, membrane pumps, scroll pumps, screw groove pumps, and axial flow molecular pumps and, for low pressure use, turbo molecular pumps (TMP), ion pumps, and getter pumps. In the conventional ion attachment mass spectrometer designed for the qualitative analysis, a bit of oil contamination was not a problem, so the wet pump was used for evacuation of the reaction chamber in the all case.

Among the conventional ion attachment mass spectrometers, the apparatus of Fujii had a large opening, so its pressure reached was low, but it used the RP with a large evacuation flow rate, while the apparatuses of Hodge and Bombick had small openings, so they had small evacuation flow rates, but used the DPs with high pressures reached. Whatever the case, in the ion attachment mass spectrometers using the wet pumps for evacuation of the reaction chamber, the reaction chamber is contaminated by the oil, so, while slight, interference peaks due to the oil components are caused and major problems arise for the quantitative analysis. Even if there is no contamination from the pump, a gas is emitted from the inside walls of the vacuum chamber or inside parts and becomes residual impurities in the vacuum chamber. The simplest way to reduce the emission of gas is baking. If the entire vacuum chamber is heated to 100 to 200° C. to sufficiently cause the emission of gas while evacuating the chamber, and then the chamber is returned to room temperature, the emission of gas is greatly reduced. In the apparatus of Fujii, there is a baking mechanism for the reaction chamber, but in the apparatuses of Hodge and Bombick, the reaction chamber is built into the first differential evacuation chamber, so there is no exclusive baking mechanism.

Further, vacuum seal materials are classified into polymer organic based materials such as rubber and Teflon and metal-based materials such as copper and aluminum. Polymer organic-based materials have the advantages of having a small clamping force and being able to adapt to complicated shapes, so have a high reliability and also are inexpensive in price, but have the disadvantages of the susceptibility to emission of gas from the materials or passage of gas from the high pressure side. Metal-based materials have features in sharp contrast to the above material. Therefore, in the conventional ion attachment mass spectrometers designed for the qualitative analysis, since gas emission or gas passage was not a problem, polymer organic-based seal materials were frequently used. In particular, since the reaction chamber becomes complicated in a shape, many polymer organic-based seal materials were used.

The inside wall surface of the vacuum chamber is sometimes treated by polishing, immobilization, and precision washing with the aim of reducing the gas emission. As polishing, acid pickling, electrolysis, buffing, shot blasting, electrolytic compounding, chemical, and other methods are known. As immobilization, the method of formation of a Cr oxide film, Si oxide film, or other film, the method of forming an oxide film of the material by heating in an oxidizing atmosphere, etc. are known. The precision washing is a method of precise washing using at least two types of solutions such as an alkali degreasing solution or purified water. These surface treatments have recently been put into practical use for semiconductor fabrication facilities. This polishing, immobilization, precision washing, and other surface treatment have not been applied to the conventional ion attachment mass spectrometers designed for qualitative analysis.

In this way, if backflow of oil from the evacuation mechanism or emission of gas from the reaction chamber occurs, the amount (partial pressure) of residual impurities present in the reaction chamber during measurement will increase and components which should not be present in the detection space will be measured. The degree of the effect can be evaluated as "a residual impurity rate", that is, the ratio of the partial pressure of the residual impurities to the total pressure during the measurement. The pressure reached when gas is not being introduced into the reaction chamber corresponds to the partial pressure of the total of the oil backflow and gas emission, so to actually find the residual impurity rate, the pressure reached in the reaction chamber should be divided by the total pressure during the measurement.

In the conventional ion attachment mass spectrometers, as mentioned above, there were considered to be problems in the four factors, that is, the applicable samples, signal-to-noise ratio, signal stability, and background (interference peaks). Therefore, these were not used for quantitative analysis. The present inventors, however, engaged in detailed studies of the ion attachment mass spectrometer only used for the special qualitative analysis in the past from a new perspective and as a result found that there were no inherent problems in the applicable samples or signal-to-noise ratio.

That is, for the applicable samples, they confirmed that the sensitivity was sufficient even with halogenated compounds with large electron affinities—for which analysis was previously thought impossible (this is already filed as Japanese Patent Application No.11-356725). Regarding this mechanism, it is believed that this is because the ease of attachment of positive ions has no relation to the ease of attachment of electrons (that is, the magnitude of the electron affinity) and is determined by the bias of the electron distribution. Regarding the signal-to-noise ratio, they found that unlike the EIMS, even if the mass signal level is increased, the noise will not increase and that the signal-to-noise ratio can be improved by various structural improvements. Regarding this mechanism, they believe the reasons are that the temperature of the filament is an extremely low 600° C. (1800° C. in the EIMS) and the more vacuum ultraviolet rays are emitted, the less the gas is excited.

Therefore, for using an ion attachment mass spectrometer as a practical quantitative analysis system, the issue becomes the improvement of the remaining two factors, that is, the signal stability and the background (interference peaks). The specific figures to be achieved differ depending on the object of measurement, but for general quantitative analysis, the following can be envisioned. Regarding signal stability, a signal stability of at least 1 to 10 percent is probably necessary. Regarding background, it is necessary for the change in concentration of the detection gas in the reaction chamber to accurately track the changes in concentration of the detection gas in the detection space, but the time factors are the evacuation time constant and the dwell rate. There probably have to be not more than 1 second and not more than 1 percent, respectively. Next, there may not be any gas other than the detection gas and the known third component gas in the reaction chamber, but the different types of gas are caused by contamination by the pump and emission of gas from the container. In both cases, the rate of residual impurities in the measurement must be not more than 1 ppm. In the conventional ion attachment mass spectrometers of the related art, these could not be realized. The reasons are not clear. Achieving these is a subject of the present invention.

SUMMARY OF THE INVENTION

An object of the present invention is to provide a method and apparatus for ion attachment mass spectrometry enabling a quantitative analysis.

The present inventors engaged in detailed studies on the signal stability required first of all in the quantitative analysis and as a result pinpointed the major factors inhibiting the signal stability in an ion attachment mass spectrometer. This is that, considered from the perspective of the ion attachment mass spectrometry apparatus shown in FIG. 9, the sensitivity is strongly dependent on the total pressure of the reaction chamber and the first differential evacuation chamber. Here, the "sensitivity" is a ratio of the mass signal to the amount of a specific component present and is a coefficient used for calculating the true amount of presence (quantitative value) from the mass signal measured in the quantitative analysis. Further, the "total pressure" is the total of the pressures (partial pressures) of all of the component gases contained. Normally, the total pressure of the reaction chamber and the differential evacuation chamber is substantially equal to the partial pressure of the third component gas.

While the sensitivity of an ion attachment mass spectrometry apparatus has dependency on the total pressure, in the EIMS or APIMS of the related art, the sensitivity is believed not to change according to the total pressure. The fact that the sensitivity changes depending on the component is well known in the EIMS or APIMS as well. There are already sensitivity tables for different components. These have become essential for quantitative measurement. These sensitivity tables, however, are based on set conditions of electron energy etc., but there are no conditions set on the total pressure. This is due to the understanding that the sensitivity does not change depending on the total pressure. In the EIMS, the sensitivity does not depend on the total pressure because other gases do not have an effect on the process of ionization by electron impact and because the operating total pressure is a low $10^{-3}$ Pa. In the APIMS, there is a possibility of dependency on the total pressure, but changes in sensitivity do not appear since the apparatus is constantly operating at a certain total pressure (atmospheric pressure). In the CIMS, the sensitivity appears to be dependent on the total pressure, but the dependency on total pressure is not clear due to other factors of instability.

FIG. 2 shows a graph of the dependency of sensitivity on the total pressure in a reaction chamber of an ion attachment mass spectrometry apparatus. The apparatus is basically the same as the apparatus according to the first embodiment explained later. The gas to be detected is for example $H_2O$ or $C_4F_8$. This graph is obtained by reading the changes in the mass signal when fixing the amounts of $H_2O$ and $C_4F_8$ present in the reaction chamber (fixed partial pressures of 1 Pa) and changing the partial pressure of the third component gas $N_2$ between 10 to 300 Pa. In both cases, the changes are close to a second order function of a top projection. The position and magnitude of the maximum value differ depending on the type of gas.

The mechanism of the dependency of sensitivity on total pressure is believed to be as follows: When the total pressure in the reaction chamber increases, the rate of absorption of the excess energy becomes higher and the gas molecules (ions) with the metal ions stably attached increase. If the total pressure further increases, however, the amount of gas molecules (ions) with the metal ions stably attached will become saturated. On the other hand, the mean free distance will become smaller, and the gas molecules (ions) passing through the opening of the aperture member will decrease. These phenomena overlap each other, so the change becomes close to a second order function with a projecting top. Further, the degree of the phenomena differs according to the type of gas, so a difference appears in the dependency according to the type of gas.

In the ion attachment mass spectrometry apparatus shown in FIG. 9, the total pressure of the first differential evacuation chamber is determined by three quantities: The total pressure of the reaction chamber, the conductance of the first aperture, and the pumping speed of the first differential evacuation chamber dry pump. In the actual measurement, however, since the conductance of the first aperture and the pumping speed of the second differential evacuation chamber dry pump are constant, the total pressure of the differential evacuation chamber is in a one-to-one correspondence with the total pressure of the reaction chamber. Therefore, the data of FIG. 2 includes not only the dependency on total pressure of the reaction chamber, but also the first differential evacuation chamber corresponding to it and is perfect for the actual measurement. More strictly speaking, however, there may be changes in sensitivity due to only the total pressure of the differential evacuation chamber.

FIG. 3 is a graph of the dependency of sensitivity on total pressure in the first differential evacuation chamber in the state with a constant total pressure of the reaction chamber. There is relatively little difference depending on the type of gas, but the reduction in sensitivity is a change close to an exponential function. This is believed to be due to the fact that the problem of absorption of excess energy is irrelevant in the first differential evacuation chamber. Only the passage of gas molecules (ions) is relevant.

In the above measurement, the flow rate of $N_2$ is changed to change the total pressure, but the $N_2$ itself is not consumed by a reaction etc., so the cause of the dependency is clearly not the flow rate, but the total pressure. Therefore, it was learned that, in both the reaction chamber and the first differential evacuation chamber, the sensitivity is dependent on the total pressure and that, further, the dependency differs depending on the type of gas.

The fact that the sensitivity is dependent on the total pressure means that even if the amount of detection gas present is the same, if the total pressure changes, the mass signal (peak height) will end up changing. In the past, this was not recognized. The total pressure differed with each measurement or the total pressure fluctuated right in the middle of measurement, so a mass signal with a good reproducibility could not be obtained. This was the reason why quantitative analysis was not possible with ion attachment mass spectrometry apparatuses.

Therefore, to enable quantitative analysis in an ion attachment mass spectrometry apparatus, securing signal stability becomes essential. In the present invention, by securing signal stability, quantitative analysis by an ion attachment mass spectrometry apparatus is made possible. Further, it was learned that the following should be done to secure signal stability in an ion attachment mass spectrometry apparatus.

The total pressure of the reaction chamber or the reaction chamber and the first differential evacuation chamber should be made accurately measurable and the total pressure should be accurately set at a certain constant value. The magnitude of the total pressure should be made a total pressure corresponding to the sensitivity used for the calculation of the quantitative value. The fluctuation of the total pressure should be kept in the range enabling error of the quantitative signal due to changes in sensitivity to be kept within an allowable range. More preferably, in the region with little change of sensitivity, that is, the reaction chamber, the total pressure should be set to 100 to 250 Pa, while in the first differential evacuation chamber, it should be set to not more than 1 Pa. By satisfying the above conditions, it is made possible to secure signal stability in the ion attachment mass spectrometry apparatus and thereby perform quantitative analysis by the ion attachment mass spectrometry apparatus.

Further, the present inventors studied the reduction in the background (interference peaks) required second for quantitative analysis. As a result, they pinpointed four factors of "evacuation time constant", "dwell rate", "contamination by pump", and "gas emitted from container" and showed that these could be solved by the following means: (1) for the evacuation time constant, reduction of the inside volume of the reaction chamber and increase of the effective evacuation, (2) for the dwell rate, elimination of corners or depressions in the reaction chamber to make the flow of the gas smooth and in one direction, (3) for the contamination by the pump, use of a dry pump free from backflow of oil for evacuation of the reaction chamber, and (4) for the gas emitted from the container, use of a metal-based seal for the seal of the reaction chamber and treatment of the inside wall surface of the reaction chamber by polishing, immobilization, and precision washing.

From the above viewpoint, the method and apparatus for ion attachment mass spectrometry according to the present invention are configured as follows:

The first method of ion attachment mass spectrometry according to the present invention is a method for causing positively charged metal ions to attach to a detection gas in a reduced pressure atmosphere to ionize the gas for measurement of mass spectrometry, comprising utilizing the property that the sensitivity of each component of the detection gas has a dependency on the total pressure of the reduced pressure atmosphere and that the dependency on the total pressure differs for each component and performing quantitative analysis while using the total pressure data of the reduced pressure atmosphere measured at the time of mass spectrometry for processing of the mass spectrometry data of each component.

Further, a second method of ion attachment mass spectrometry according to the present invention is a method for causing positively charged metal ions to attach to a detection gas in a reduced pressure atmosphere to ionize the gas for measurement of mass spectrometry, comprising utilizing the property that the sensitivity of each component of the detection gas has a dependency on the total pressure of the reduced pressure atmosphere and that the dependency on the total pressure differs for each component and performing quantitative analysis while using the total pressure data of the reduced pressure atmosphere measured at the time of mass spectrometry for setting the measurement conditions for the mass spectrometry of each component.

In the above methods of ion attachment mass spectrometry, a quantitative value is calculated for each component using the sensitivity corresponding to the total pressure during measurement. In the calculation, the quantitative value is obtained by dividing the signal obtained by the mass spectrometer by a coefficient relating to the sensitivity for each component.

In the above methods of ion attachment mass spectrometry, the total pressure during measurement is set within an allowable fluctuation of total pressure.

In the above methods, the allowable fluctuation of total pressure is calculated for each component using a rate of change of sensitivity corresponding to the total pressure during the measurement and a required quantitative error value.

The first apparatus for ion attachment mass spectrometry according to the present invention is apparatus for measurement of mass spectrometry after causing positively charged metal ions to attach to a detection gas to ionize it through a reaction chamber and analysis chamber providing a reduced pressure atmosphere, provided with the reaction chamber for causing positively charged metal ions to attach to the detection gas; a mass spectrometer for mass separation and detection of the detection gas to which the positively charged metal ions are attached; the analysis chamber in which the mass spectrometer is placed; an introduction mechanism for introducing a gas containing the detection gas into the reaction chamber; an evacuation mechanism for evacuating the gas containing the detection gas; a data processor for receiving and processing a mass signal from the mass spectrometer; and a vacuum gauge for measuring the total pressure of the reduced pressure atmosphere; a total pressure signal from the vacuum gauge measured during the measurement being input to the data processor; the data processor being provided with a processing means for performing quantitative analysis of each component utilizing the fact that the sensitivity of each component has a dependency on the total pressure of the reduced pressure atmosphere and that the dependency on total pressure differs for each component.

The second apparatus for ion attachment mass spectrometry according to the present invention is a mass spectrometry apparatus having the above configuration and exhibiting the above actions, wherein provision is made of a vacuum gauge for measuring the total pressure of the reduced pressure atmosphere; a total pressure signal from the vacuum gauge measured during the measurement is input to the introduction mechanism or the evacuation mechanism; the data processor performs quantitative analysis of each component.

In the ion attachment mass spectrometry apparatus having this configuration, preferably a differential evacuation chamber of a reduced pressure atmosphere for connecting the reaction chamber and the analysis chamber in a vacuum state is provided between the reaction chamber and the analysis chamber.

In the above apparatus for ion attachment mass spectrometry, the total pressure signal is input to the data processor, and the data processing means of the data processor calculates a quantitative value of each component using a sensitivity corresponding to the total pressure during measurement and a mass signal. The processing means calculates the quantitative value by dividing the mass signal by a coefficient relating to sensitivity.

In the above apparatus for ion attachment mass spectrometry, the total pressure signal is input to the introduction mechanism or the evacuation mechanism, and the introduction mechanism or the evacuation mechanism is controlled using the total pressure signal so that the total pressure of the reduced pressure atmosphere becomes within an allowable fluctuation of total pressure.

In the above apparatus for ion attachment mass spectrometry, the total pressure signal is input to the data processor, and the data processor uses the total pressure signal to monitor that the total pressure of the reduced pressure atmosphere is within an allowable fluctuation of total pressure.

In the above apparatus for ion attachment mass spectrometry, the allowable fluctuation of total pressure is calculated from a rate of change of sensitivity corresponding to the total pressure of the reduced pressure atmosphere during measurement and a required quantitative error value.

In the above configuration, it is possible to freely select any reduced pressure atmosphere for measuring and controlling the total pressure. For example, it may be provided by the reaction chamber and differential exchange chamber or may be the reaction chamber. Further, the reduced pressure atmosphere for measuring the total pressure may be provided by the differential evacuation chamber, while the reduced pressure atmosphere for controlling the total pressure may be provided by the reaction chamber.

In the above configuration, the dependency of the sensitivity on the total pressure of the reaction chamber may be approximated by a second order function. Further, the dependency of the sensitivity on the total pressure of the differential evacuation chamber may be approximated by an exponential function.

The total pressure of the reaction chamber is preferably set, maintained, and measured in a region with a small rate of change of the sensitivity. The total pressure of the reaction chamber is preferably set and maintained at 50 to 250 Pa. Further, the total pressure of the differential evacuation chamber is preferably set, maintained, and measured in a region with a small rate of change of the sensitivity. The total pressure of the differential evacuation chamber is preferably set and maintained at no more than 1 Pa.

The introduction mechanism or evacuation mechanism is characterized in that feedback control is performed on the total pressure of the reduced pressure atmosphere by the total pressure signal from the vacuum gauge.

Further, use is made of an introduction mechanism and an evacuation mechanism with a total of the maximum rate of fluctuation of the amount of introduction and the maximum rate of fluctuation of the pumping speed smaller than the allowable rate of fluctuation of the total pressure of the reduced pressure atmosphere.

As the evacuation mechanism, it is preferable to use a dry pump. Further, as this dry pump, a turbo molecular pump, axial flow molecular pump, or screw groove pump is preferably used.

The inside volume of the reaction chamber and the effective pumping speed of the evacuation mechanism are preferably determined so that the evacuation time constant of the reaction chamber becomes no more than 1 second. Further, the inside shape of the reaction chamber and the effective pumping speed of the evacuation mechanism are preferably determined so that the rate of dwell in the reaction chamber becomes no more than 1 percent. Further, the amount of emission of gas of the reaction chamber and the partial pressure of impurities during operation of the evacuation mechanism are preferably determined so that the rate of residual impurities of the reaction chamber becomes no more than 1 ppm.

In the ion attachment mass spectrometry apparatus, it is preferable to use a diaphragm type vacuum gauge as the above vacuum gauge, it is preferable to provide a baking mechanism in the reaction chamber, and it is preferable to use a metal-based material for the seal material of the reaction chamber.

As clear from the above explanation, according to the present invention, the ion attachment mass spectrometry apparatus obtains the sensitivity characteristic, dependent on the total pressure, for the type of gas for which quantitative analysis is to be performed and performs predetermined processing on the mass signal obtained from the mass spectrometer using a coefficient relating to the sensitivity, so the ion attachment mass spectrometry apparatus can solve the original problem of signal stability and the problem of background (interference peak) in quantitative analysis.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Preferred embodiments of the present invention will be explained next with reference to the attached drawings.

First Embodiment

Figure 1:
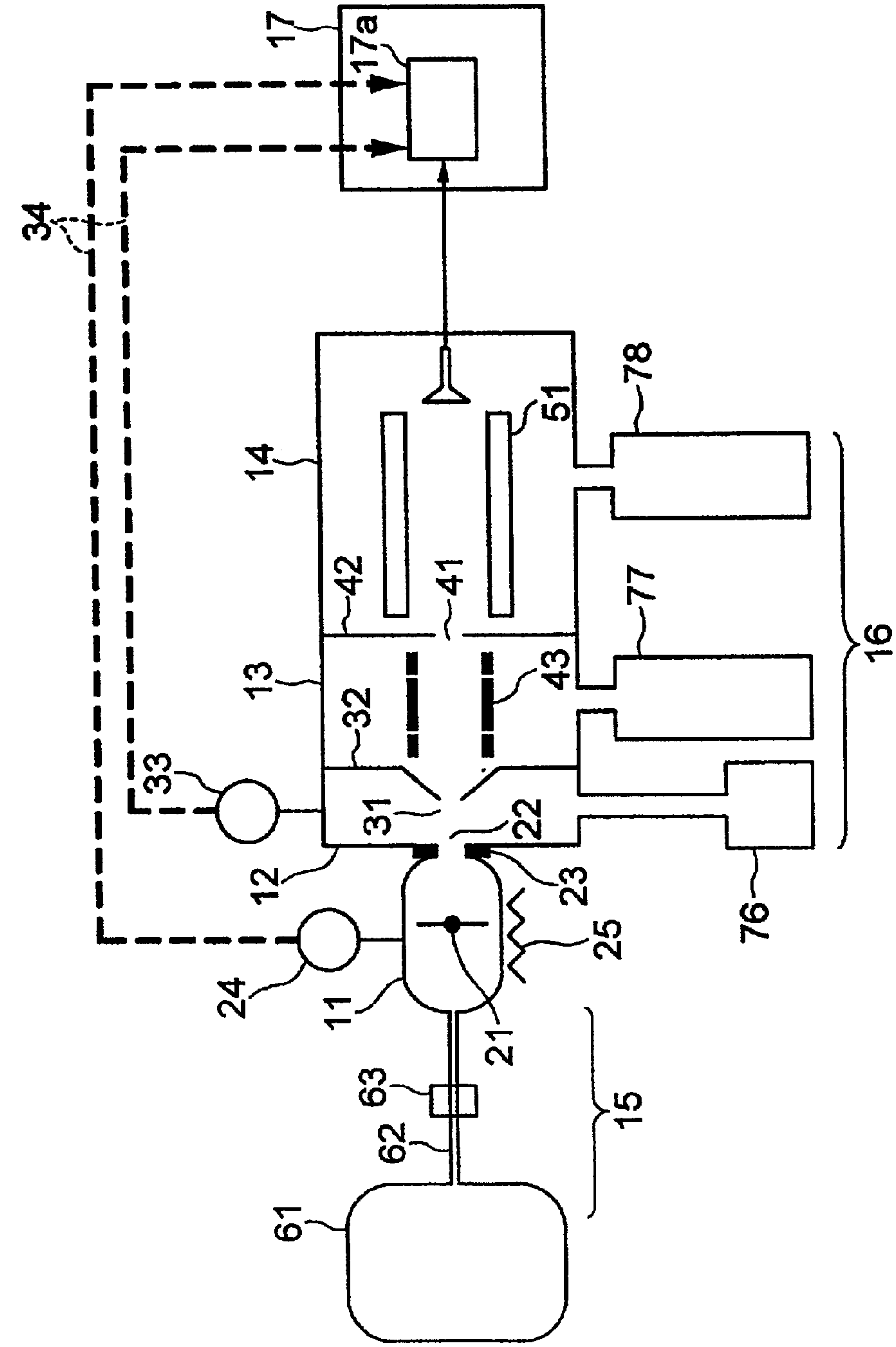
FIG. 1 is a view of the configuration of a first embodiment of an ion attachment mass spectrometry apparatus according to the present invention.

A first embodiment of the ion attachment mass spectrometry apparatus according to the present invention will be explained next with reference to FIG. 1. First, the constituent elements will be explained. In FIG. 1, 11 is a reaction chamber, 12 a first differential evacuation chamber, 13 a second differential evacuation chamber, 14 an analysis chamber, 15 a gas introduction mechanism, 16 an evacuation mechanism, and 17 a data processor. Reference numeral 21 is an emitter, 22 a first aperture, 23 a reaction chamber seal, 24 a reaction chamber vacuum gauge, and 25 a baking mechanism. Further, reference numeral 31 is a second aperture, 32 a partition of the first differential evacuation chamber, 33 a first differential evacuation chamber vacuum gauge, 34 a fine total pressure signal line (for example, a signal able to give a continuous value or discrete values close to the same), 41 a third aperture, 42 a partition of the second differential evacuation chamber, 43 an electrostatic lens, and 51 a Q-pole mass spectrometer. Reference numeral 61 is a detection space, 62 a pipe, and 63 a flow rate adjustment valve. Reference numeral 76 is a first differential evacuation chamber dry pump, 77 a second differential evacuation chamber dry pump, and 78 an analysis chamber dry pump. The detection gas is present in the detection space 61 in a 100 percent concentration or contained in a base gas.

Figure 7:
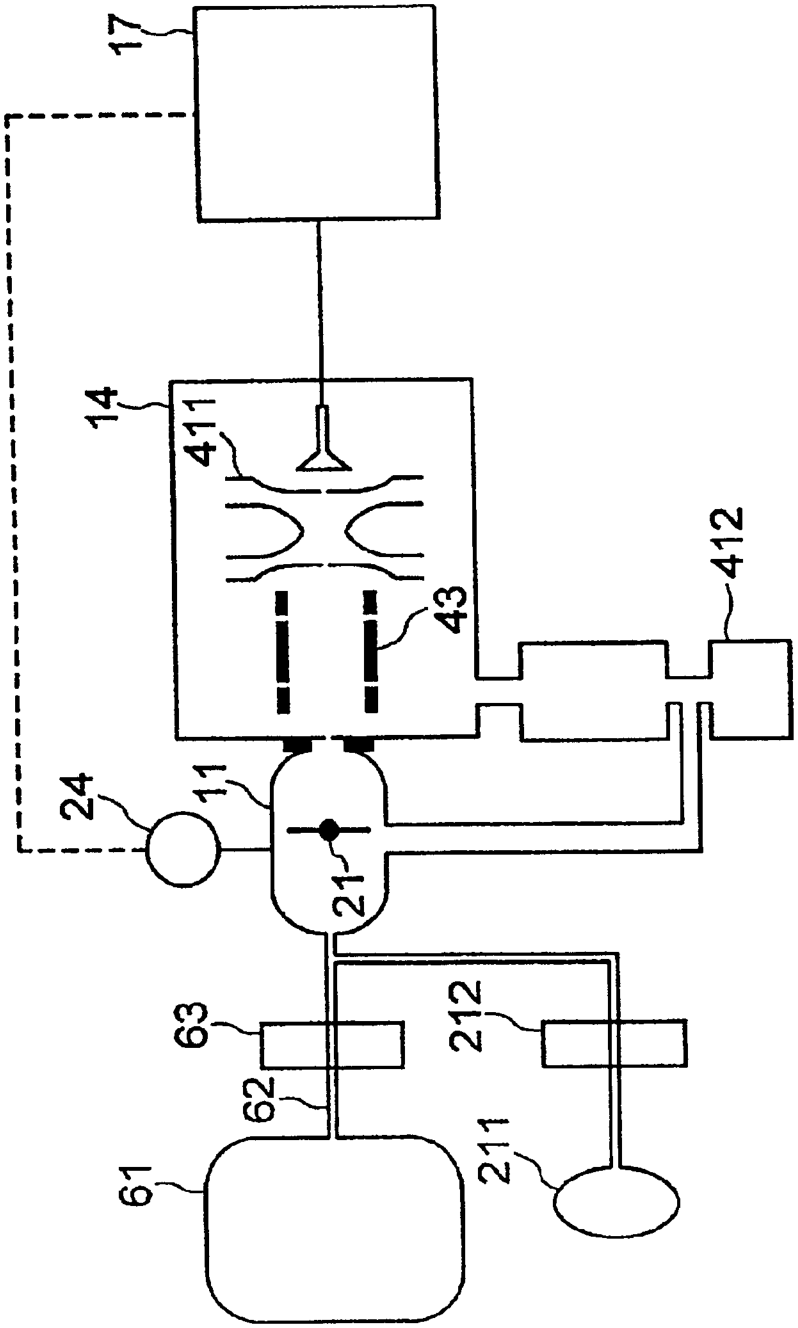
FIG. 7 is a view of the configuration of a fifth embodiment of an ion attachment mass spectrometry apparatus according to the present invention.

The configuration of the present embodiment is generally the same in its basic parts as that of the apparatus of the related art of Fujii explained with reference to FIG. 7. The ion attachment mass spectrometry apparatus of the present embodiment, however, differs from the apparatus of Fujii in the following points.

A differential evacuation chamber vacuum gauge 33 is newly mounted in the first differential evacuation chamber 12. The reaction chamber vacuum gauge 4 and the differential evacuation chamber vacuum gauge 33 form a diaphragm type vacuum gauge able to accurately measure the total pressure. The fine total pressure of the reaction chamber 11 and the first differential evacuation chamber 12 is input to the data processor 17 by having the data processor 17 and the reaction chamber vacuum gauge 24 and differential evacuation chamber vacuum gauge 33 connected to a fine total pressure signal line 34.

Further, the reaction chamber 11 is a streamlined type with no depressions or corners. The inside wall surface is polished, immobilized, and precision washed. A metal based material is used for the reaction chamber seal 23. The pipe 62 of the gas introduction mechanism 15 is attached at the upstream-most part of the reaction chamber 11. The first differential evacuation chamber dry pump 76 is an axial flow molecular pump, while the second differential evacuation chamber dry pump 77 and the analysis chamber dry pump 78 are made turbo molecular pumps.

The operation of the ion attachment mass spectrometry apparatus of the present embodiment having this configuration will be explained next. Quantitative analysis is performed by this ion attachment mass spectrometry apparatus.

The data processor 13 receives as input the mass signal from the Q-pole mass spectrometer 51 and the fine total pressure signal from the reaction chamber vacuum gauge 24 and the differential evacuation chamber vacuum gauge 33 in substantially real time. The data processor 17 calculates the quantitative value using this mass signal and a sensitivity corresponding to the total pressure actually measured (coefficient relating to sensitivity). The data processor 13 includes a processing means as a means for calculating the quantitative value. This processing means 17*a* calculates the quantitative value by dividing the mass signal by the coefficient relating to the sensitivity.

The diameter of the first aperture is for example a small one of 1.5 mm. With this aperture area, the conductance becomes 0.2 l. (liter)/s(second). The pumping speed of the axial flow molecular pump is made 5 l./s, whereby the effective pumping speed with respect to the reaction chamber becomes about 0.2 l./s. As opposed to this, the inside volume of the reaction chamber is 0.1 liter, so the evacuation time constant becomes 0.5 second. Therefore, a required quick response of an evacuation time constant of not more than 1 second is realized.

In this embodiment, as mentioned above, the inside shape of the reaction chamber is a streamlined one with no depressions or corners and the pipe 62 is attached at the upstream-most part of the reaction chamber, so the flow of the gas in the reaction chamber becomes smooth and almost no accumulation occurs. Compared with the related art, it is clear that the rate of dwell becomes extremely low. It is difficult to estimate the level of the dwell rate accurately, but a dwell rate of not more than 1 percent is expected to be realized.

The total pressure reached by the axial flow molecular pump is at the $10^{-4}$ Pa level, but the main component of the residual components at this time is H2 which does not form an interference peak. The high mass components forming interference peaks are present in not more than $\frac{1}{10}$th of this. Therefore, the reaction chamber evacuated by the axial flow molecular pump is free from oil contamination from the pump and has a partial pressure of the residual impurities of not more than $1\times10^{-4}$ Pa. The amount of emission of gas becomes extremely low due to the treatment of the inside walls of the reaction chamber, the baking, and the use of a metal-based seal. Therefore, a rate of residual impurities in the reaction chamber of not more than 1 ppm (value obtained by dividing the partial pressure of not more than $1\times10^{-4}$ Pa of the residual impurities by the total pressure 100 Pa during measurement) is realized. Note that with the apparatus of the related art of Fujii, the residual impurities were probably at a level of 1000 ppm since a RP was used for evacuation.

Since the reaction chamber 11 is at 100 Pa, the diameter of the second aperture 31 is 2 mm, and the pumping speed of the second differential evacuation chamber dry pump 77 is 100 l./s, the first differential evacuation chamber 12 becomes 4 Pa and the second differential evacuation chamber 13 becomes the $10^{-3}$ Pa level. Therefore, from FIG. 2 and FIG. 3, it is learned that the total pressure of the reaction chamber 11 and the first differential evacuation chamber 12 has a large effect on the sensitivity. Since the total pressure of the second differential evacuation chamber 13 and the reaction chamber 14 is sufficiently low, however, it can be easily deduced that there is almost no effect on the sensitivity. Therefore, in this embodiment, the total pressure of the second differential evacuation chamber 13 and the analysis chamber 13 are not measured or controlled.

Next, an explanation will be given of the method for calculating a quantitative value in the above ion attachment mass spectrometry apparatus performing quantitative analysis.

First, before the actual measurement, the following preliminary measurement is performed. A gas of a known concentration and a specific component is introduced into the detection space 61. It is possible to use a single gas tank filled with the gas of the known concentration and specific component in a base gas or use two gas tanks, that is, a gas tank filled with a gas of 100 percent concentration and the specific component and a gas tank filled with the base gas, and control the ratio of introduction into the detection space 61. The flow rate adjustment valve 63 is adjusted while measuring the total pressure of the reaction chamber by the reaction chamber vacuum gauge 24 so as to introduce the detection gas into the reaction chamber 11 and make the reaction chamber 11 a specific total pressure. The amount of the specific component present in the reaction chamber 11 (partial pressure) may be calculated from the amount of increase of total pressure due to the introduction and the known concentration in the detection space 61. If the mass signal measured in this state is divided by the partial pressure of the specific component, the sensitivity is calculated. For example, if the mass signal is measured in units of A (ampere) and the partial pressure in units of Pa (Pascals), the sensitivity becomes A/Pa. The sensitivity of the specific component at a specific total pressure can be determined by the total pressure of the reaction chamber 11 and the first differential evacuation chamber 12 at this time.

Figure 2:
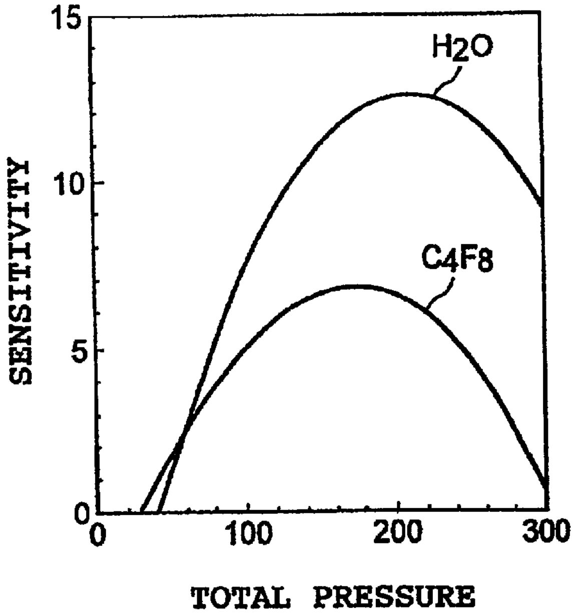
FIG. 2 is a graph of the dependency of sensitivity on the total pressure of a reaction chamber relating to the first embodiment.
Figure 3:
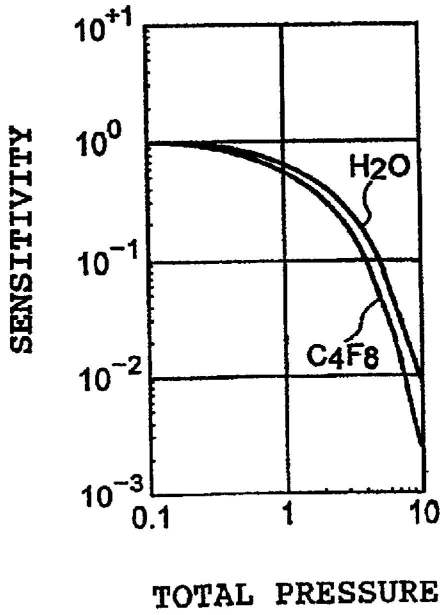
FIG. 3 is a graph of the dependency of sensitivity on the total pressure of an differential evacuation chamber relating to the first embodiment.

To calculate a quantitative value, it becomes necessary to find a graph of dependency of sensitivity on the total pressure of the reaction chamber shown in FIG. 2 for each specific component. In this example, the dependency of sensitivity on the total pressure of the reaction chamber is shown for $H_2O$ and $C_4F_8$. Finely changing the total pressure and drawing a graph for the actual measured values, however, entails a tremendous amount of work, so it is preferable to find the sensitivity at representative total pressures of several points and find a graph by approximation of these by a second order curve. When considering the dependency due to the first differential evacuation chamber 12, a graph of the dependency of sensitivity on the total pressure of the differential evacuation chamber such as shown in FIG. 3 becomes necessary. In this case as well, it is possible to find a graph by approximation of the actually measured values of several points by an exponential function. In this example as well, the dependency of sensitivity on the total pressure of the differential evacuation chamber is shown for $H_2O$ and $C_4F_8$. The dependencies of sensitivity on total pressure of the specific components found in this way are input in advance into the data processor 17 and stored in its memory. The sensitivity data which is required, however, is that of the component used for actual measurement and should be in the range of total pressure used for measurement.

Further, it is possible to introduce a plurality of types of gas of known concentrations and specific components into the detection space 61, it would be possible to simultaneously find the dependency of sensitivity on the total pressure of the reaction chamber for the plurality of specific components. For this, it is possible to prepare a gas tank filled with a mixture of the plurality of gases of known concentrations or to introduce the gases into the detection space 61 from individual tanks filled with single components in a known ratio of introduction.

Next, in actual measurement, the following processing is performed. The quantitative analysis related to the detection gas is measured and the total pressure of the reaction chamber 11 or the reaction chamber 11 and the first differential evacuation chamber 12 during measurement is measured. The data processor 17 receives as input a mass signal from the Q-pole mass spectrometer 51 and the fine total pressure signals from the reaction chamber vacuum gauge 24 and the differential evacuation chamber vacuum gauge 33 in substantially real time. As the total pressure signal, a value with two effective digits is for example input every second at a one second delay. In the data processor 17, the processing means 17*a* calls up the sensitivity corresponding to the component being actually measured and the total pressure and calculates the quantitative value by dividing the mass signal of the Q-pole mass spectrometer 51 by the sensitivity (coefficient relating to sensitivity).

In this way, in the present embodiment, since the sensitivity corresponding to the pressure during measurement is used in the quantitative calculations, the total pressure of the reaction chamber and the first differential evacuation chamber can be set to any value. Further, since the total pressure of the reaction chamber and the first differential evacuation chamber is not feedback controlled, it may fluctuate along with time, but the processing for input of the total pressure signal, input of the mass signal, and calculation of the quantitative value is substantially performed in real time, so even if the pressure fluctuates, it is possible to always calculate the correct quantitative value.

Note that what is calculated by this method is the amount of a specific component present in the reaction chamber 11. Therefore, only naturally, to find the amount present in the detection space 61, the amount present in the reaction chamber should be divided by the reduced pressure ratio of the reaction chamber 11 with respect to the detection space 61.

Second Embodiment

Figure 4:
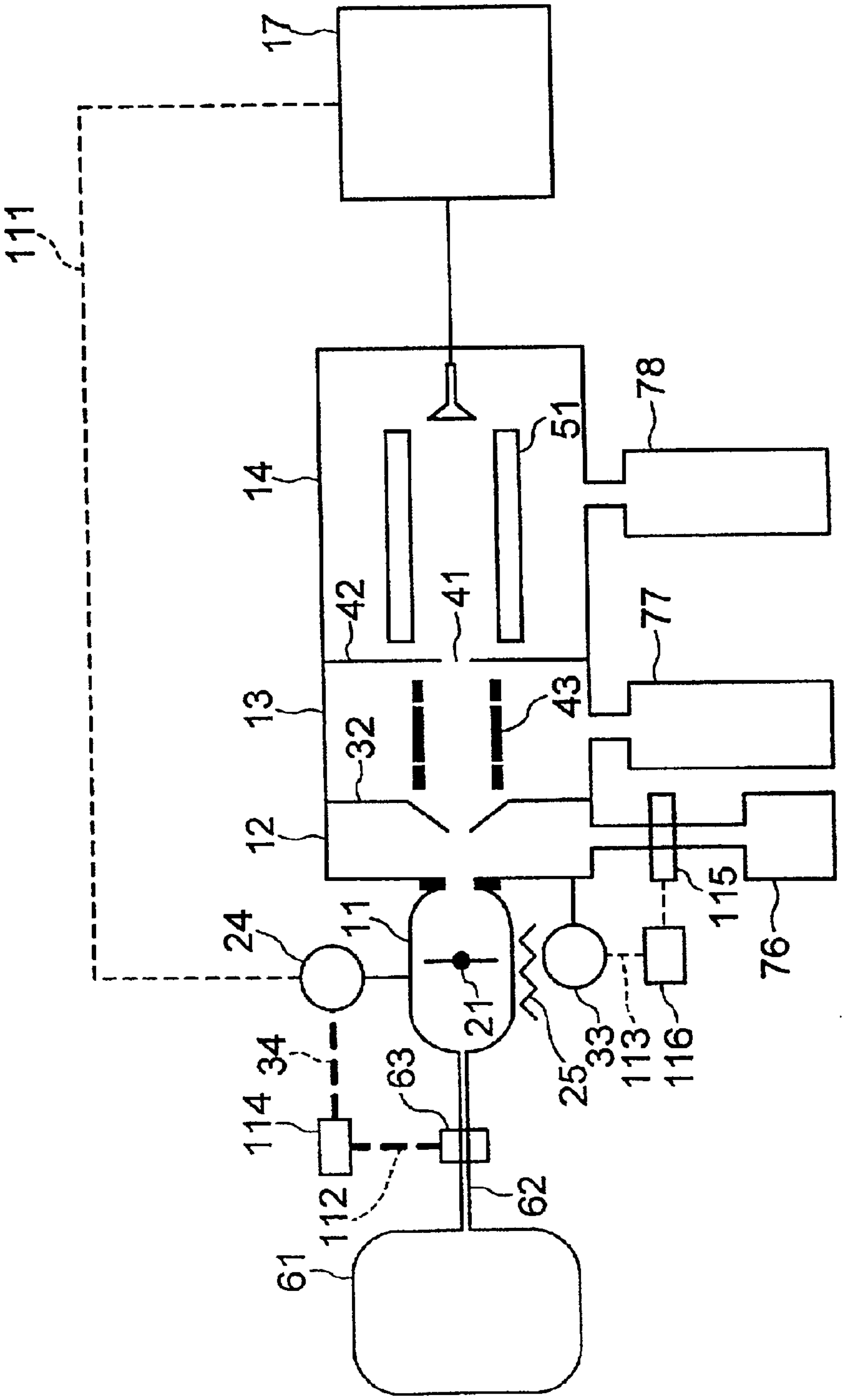
FIG. 4 is a view of the configuration of a second embodiment of an ion attachment mass spectrometry apparatus according to the present invention.

A second embodiment of the ion attachment mass spectrometry apparatus according to the present invention will be explained next with reference to FIG. 4. In FIG. 4, elements substantially the same as elements explained in FIG. 1 are assigned the same reference numerals. In FIG. 4, 111 represents a simple total pressure signal line, 112 a flow rate adjustment signal line, 113 a conductance adjustment signal line, 114 a flow rate adjustment controller, 115 a conductance adjustment valve, and 116 a conductance controller. The rest of the configuration is the same as the configuration explained with reference to FIG. 1.

The configuration of the present embodiment is the same as the configuration of the first embodiment in basic parts. Further, it has distinctive features. That is, the reaction chamber vacuum gauge 24 and the data processor 17 are connected by a simple total pressure signal line 111. Not the fine total pressure signal 8 (for example, analog signal changing continuously), but just a contact signal (signal showing of upper or lower limits have been exceeded) is input to the data processor 17. The contact signal is used as a monitoring signal. The reaction chamber vacuum gauge 24 and the flow rate adjustment controller 114 are connected by a fine total signal line 34. The fine total pressure signal is input to the flow rate adjustment controller 114. The flow rate adjustment controller 114 and the flow rate adjustment valve 63 are connected by the flow rate adjustment signal line 112. The flow rate adjustment valve 63 is finely controlled through this. Similarly, the conductance adjustment valve 115 is finely controlled by the differential evacuation chamber vacuum gauge 33, the fine total pressure signal 113, and the conductance controller 116.

In the operation of the ion attachment mass spectrometry apparatus of the second embodiment, the total pressure of the reaction chamber 11 and the total pressure of the first differential evacuation chamber are maintained at specific values by feedback control. Therefore, basically, the total pressure of the reaction chamber 11 and the first differential evacuation chamber 12 is constant and free from fluctuation over time over a long range. Therefore, the dependency of sensitivity on the total pressure over a broad range is not needed for quantitative calculations. Only the sensitivity for a specific total pressure is required. Therefore, the preliminary measurement for obtaining the dependency of sensitivity on total pressure and the quantitative measurement in the actual measurement become extremely simple.

In the first embodiment, no error occurs in the quantitative value even if the total pressure fluctuates during measurement. With the configuration of this embodiment, however, if the total pressure fluctuates, error occurs in the quantitative value. Therefore, the amount of fluctuation of the total pressure over a short range at the time of measurement becomes an issue. That is, to secure a certain quantitative error, it is necessary to maintain the total pressure with an amount of fluctuation of total pressure which can be allowed at the time of measurement (allowable fluctuation of total pressure).

If the quantitative error is $\Delta S$, the allowable fluctuation of total pressure is $\Delta P$, the function of sensitivity having total pressure as a variable is S(P), and the derived function of S(P) (function differentiated for P) is S' (P), S' (P) is deemed to be the "rate of change of sensitivity". The relationship of $\Delta S(Pm)=\Delta P(Pm)\times S'(Pm)$ stands among the quantitative error $\Delta S(Pm)$ near the total pressure Pm at the time of measurement, the allowable fluctuation of total pressure $\Delta P(Pm)$, and the rate of change of sensitivity S'(Pm). That is, if the dependency of sensitivity on the total pressure S(P) is obtained in advance, the allowable fluctuation of total pressure $\Delta P$ can be found. Therefore, at the time of measurement, it is sufficient to control the total pressure so that the allowable fluctuation of total pressure can be maintained.

In practice, however, even without such actual measurement and strict calculation, the allowable fluctuation of total pressure can be estimated from a representative dependency on total pressure. Further, by matching the set total pressure with a small value of the rate of change of sensitivity, that is, with the flat portion of the graph, the allowable fluctuation of total pressure can be increased and control facilitated.

Whatever the case, if the total pressure fluctuates more than the allowable fluctuation of total pressure during measurement, the quantitative value becomes mistaken. For confirmation, a contact signal matched with the allowable fluctuation of total pressure is input from the reaction chamber vacuum gauge 24 to the data processor 17 to enable the suitability of the obtained quantitative value to be judged. That is, a monitoring use error signal is input from the vacuum gauge. Note that by providing the differential evacuation chamber vacuum gauge, it is also possible to input the error signal from the vacuum gauge.

Third Embodiment

Figure 5:
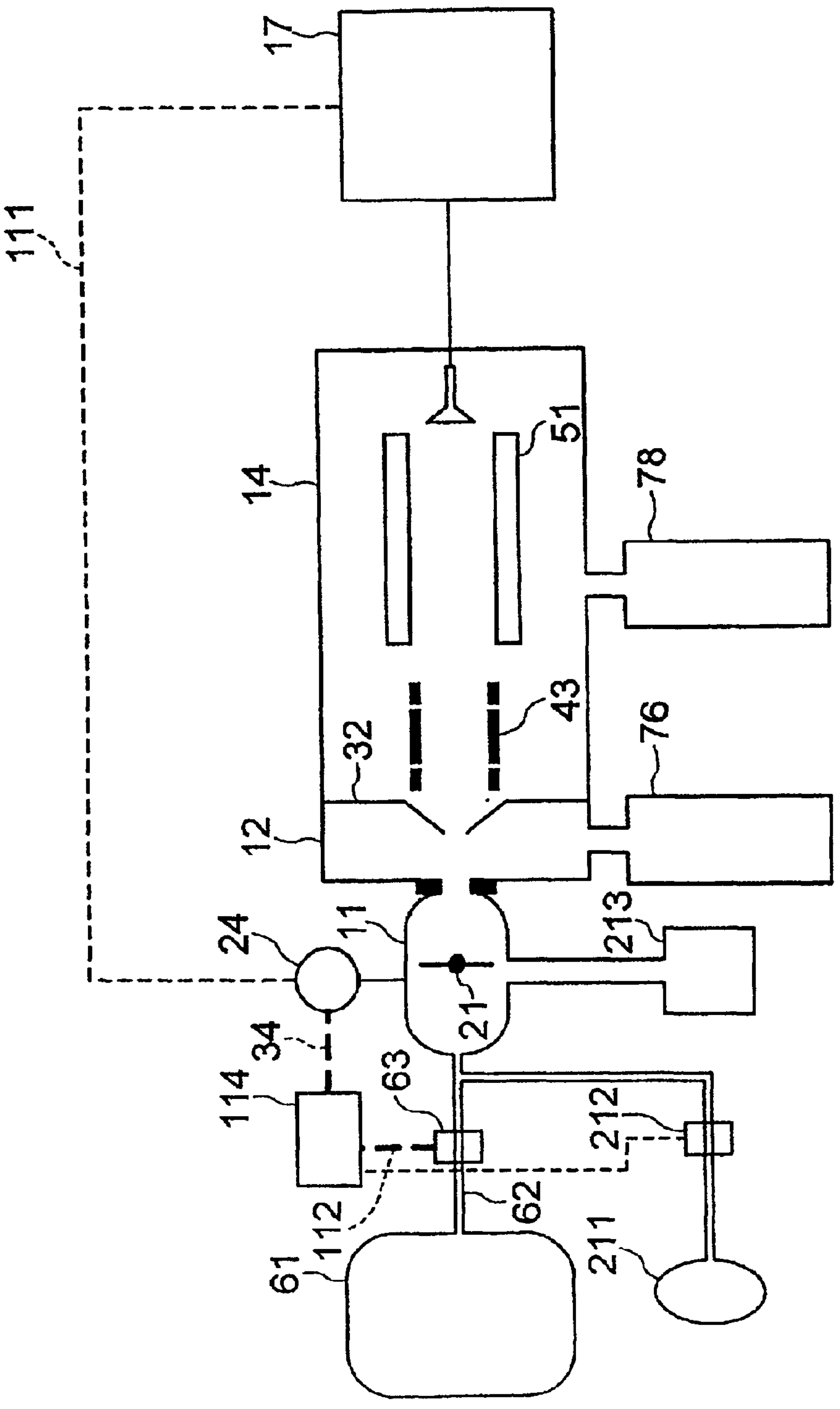
FIG. 5 is a view of the configuration of a third embodiment of an ion attachment mass spectrometry apparatus according to the present invention.

A third embodiment of the ion attachment mass spectrometry apparatus according to the present invention will be explained next with reference to FIG. 5. In FIG. 5, 211 is a third component gas tank, 212 is a third component gas flow rate adjustment valve, and 213 a reaction chamber dry pump. The rest of the configuration in FIG. 5 is the same as the configuration shown in FIG. 1 or FIG. 4. Elements substantially the same as the elements explained with reference to the above embodiments are assigned the same reference numerals.

The configuration according to this embodiment resembles that of the second embodiment in basic parts. The distinctive feature is the direct attachment of the reaction chamber dry pump 213 to the reaction chamber 11. The reaction chamber dry pump 213 is an axial flow molecular pump with an pumping speed of 5 l./s. The diameter of the first aperture 22 is made a small 1 mm and the conductance is made 0.1 l./s. For the first differential evacuation chamber dry pump 76, use is made of a turbo molecular pump able to evacuate the chamber to a lower pressure than an axial flow molecular pump and having an pumping speed of at least 100 l./s. The flow rate adjustment controller 114 can independently control the flow rate adjustment valve 63 and third component gas flow rate adjustment valve 212. In this embodiment, there is no first differential evacuation chamber vacuum gauge. There is no second differential evacuation chamber 13 shown in FIG. 1. Only naturally, there is also no second differential evacuation chamber dry pump or partition between the second differential evacuation chamber and analysis chamber. However, the electrostatic lens 43 remains at the same position, so is placed in the analysis chamber 14.

The basic operation of the ion attachment mass spectrometry apparatus according to the third embodiment resembles the operation of the second embodiment. Its characteristic features are the 0.2 second evacuation time constant of the reaction chamber and the realization of a faster response. The total pressure of the first differential evacuation chamber 12 is not more than 0.1 Pa. According to FIG. 3, when the total pressure of the first differential evacuation chamber 12 is lower than 0.1 Pa, the sensitivity becomes substantially constant, so the total pressure signal is not input to the data processor 17 and feedback control of the total pressure is not performed, but a stable signal can be obtained. Further, since the total pressure of the first differential evacuation chamber 12 is low, the total pressure of the analysis chamber 14 becomes a sufficiently low value even without the second differential evacuation chamber 13.

The reaction chamber 11 is fed both the detection gas from the detection space 61 and the third component gas from the third component gas tank 211. The ratio of introduction, that is, the ratio of the amount of introduction of the detection gas to the two gases, is determined from the concentration, properties, etc. of the detection gas. For example, when the detection gas has a high concentration in the detection space 61 and has the property of being easily contaminated, the ratio of introduction of the detection gas is reduced and the rate of dilution by the third component gas is increased.

The flow rate adjustment controller 114 performs feedback control on the flow rate adjustment valve 63 and the third component gas flow rate adjustment valve 212 so that the reaction chamber 11 is maintained at a specific total pressure while keeping the ratio of amount of introduction of the detection gas and the third component gas constant. To find the amount present in the detection space 61, the amount of presence in the reaction chamber 11 may be divided by the rate of pressure reduction of the reaction chamber 11 and the ratio of introduction.

Fourth Embodiment

Figure 6:
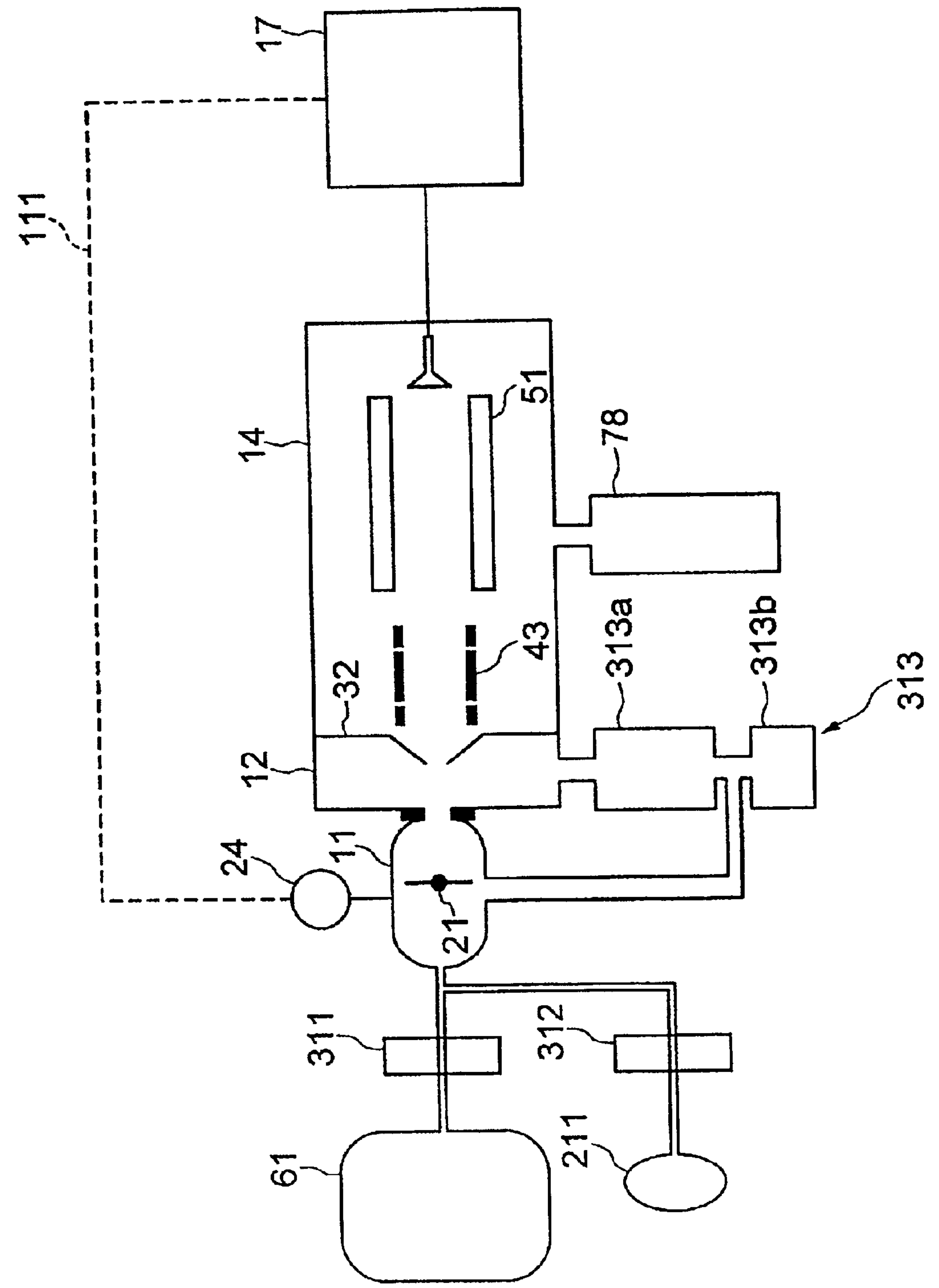
FIG. 6 is a view of the configuration of a fourth embodiment of an ion attachment mass spectrometry apparatus according to the present invention.

A fourth embodiment of the ion attachment mass spectrometry apparatus according to the present invention will be explained next with reference to FIG. 6. In FIG. 6, 211 indicates a third component gas tank, 311 a high precision flow rate adjustment valve, 312 a high precision third component gas flow rate adjustment valve, and 313 a compound dry pump for the reaction chamber 11 and the first differential evacuation chamber 12. In FIG. 6, the rest of the configuration is the same as the configuration of the embodiment shown in FIG. 5. Elements substantially the same as elements shown in FIG. 5 are assigned the same reference numerals.

The configuration of the ion attachment mass spectrometry apparatus according to this embodiment basically resembles that of the third embodiment. In this embodiment, there is no flow rate adjustment controller 114. The high precision flow rate adjustment valve 31 and high precision third component gas flow rate adjustment valve 312 do not change much with temperature or aging. The compound dry pump 313 for the reaction chamber 11 and the first differential evacuation chamber 12 is a combination of a front half of the turbo molecular pump **313*a* and a rear half of the axial flow molecular pump (or screw groove pump) 313*b*. The front inlet is connected to the differential evacuation chamber 12, while the rear inlet is connected to the reaction chamber 11 from the side. Therefore, the rear axial flow molecular pump 313*b* performs the two functions of maintaining the back pressure of the turbo molecular pump 313*a* and evacuation of the reaction chamber 11**.

In the ion attachment mass spectrometry apparatus according to the fourth embodiment, feedback control is not performed for the high precision flow rate adjustment valve 311 and the high precision third component gas flow rate adjustment valve 312. The magnitude of the flow rate is fixed. Since a high precision flow rate adjustment valve not changing much with temperature aging is used and the reaction chamber 11 is evacuated by a large pumping speed, the total pressure of the reaction chamber 11 can be maintained within the allowable fluctuation of the total pressure. This is because the amount of fluctuation of the total pressure is proportional to the amount of fluctuation of the amount of introduction and the amount of fluctuation of the pumping speed and is inversely proportional to the absolute value of the pumping speed.

Fifth Embodiment

A fifth embodiment of the ion attachment mass spectrometry apparatus according to the present invention will be explained next with reference to FIG. 7. In FIG. 7, 411 represents a three-dimensional (3D) mass spectrometer, and 412 a composite dry pump for the reaction chamber 11 and analysis chamber 14. The rest of the configuration in the fifth embodiment is substantially the same as that of the fourth embodiment explained above. Elements substantially the same as elements shown in FIG. 6 are assigned the same reference numerals.

The configuration of the present embodiment is generally the same as that of the fourth embodiment. The characterizing part resides in the use as the mass spectrometer of a three-dimensional (3D) mass spectrometer 411 able to operate even at 0.1 Pa. In this embodiment, there is no first differential evacuation chamber 12. Only naturally, therefore, there is no first differential evacuation chamber dry pump 76 or first differential evacuation chamber diaphragm 32. The composite pump 412 for the reaction chamber 11 and the analysis chamber 14 is the same as the composite dry pump 313 for the reaction chamber and the first differential evacuation chamber, but the previous inlet is connected to the analysis chamber 14.

The operation in the ion attachment mass spectrometry apparatus according to this embodiment is generally the same as the operation of the fourth embodiment. The characteristic part resides in the fact that the composite dry pump 412 for the reaction chamber and the analysis chamber is the only vacuum pump. The total pressure of the analysis chamber is less than 0.1 Pa, but mass spectrometry may be performed normally by the three-dimensional (3D) mass spectrometer 411.

Sixth Embodiment

Figure 8:
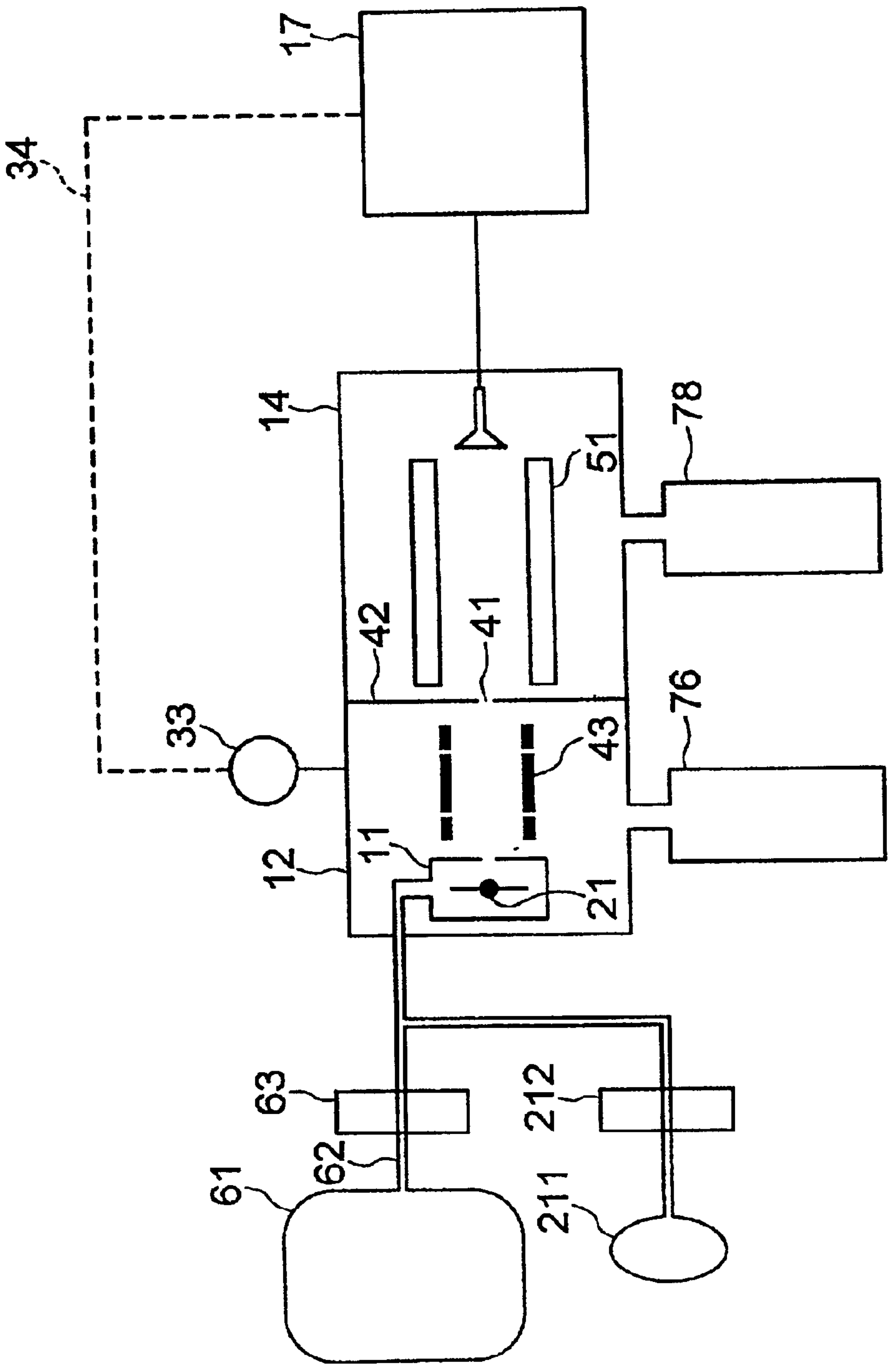
FIG. 8 is a view of the configuration of a sixth embodiment of an ion attachment mass spectrometry apparatus according to the present invention.
Figure 9:
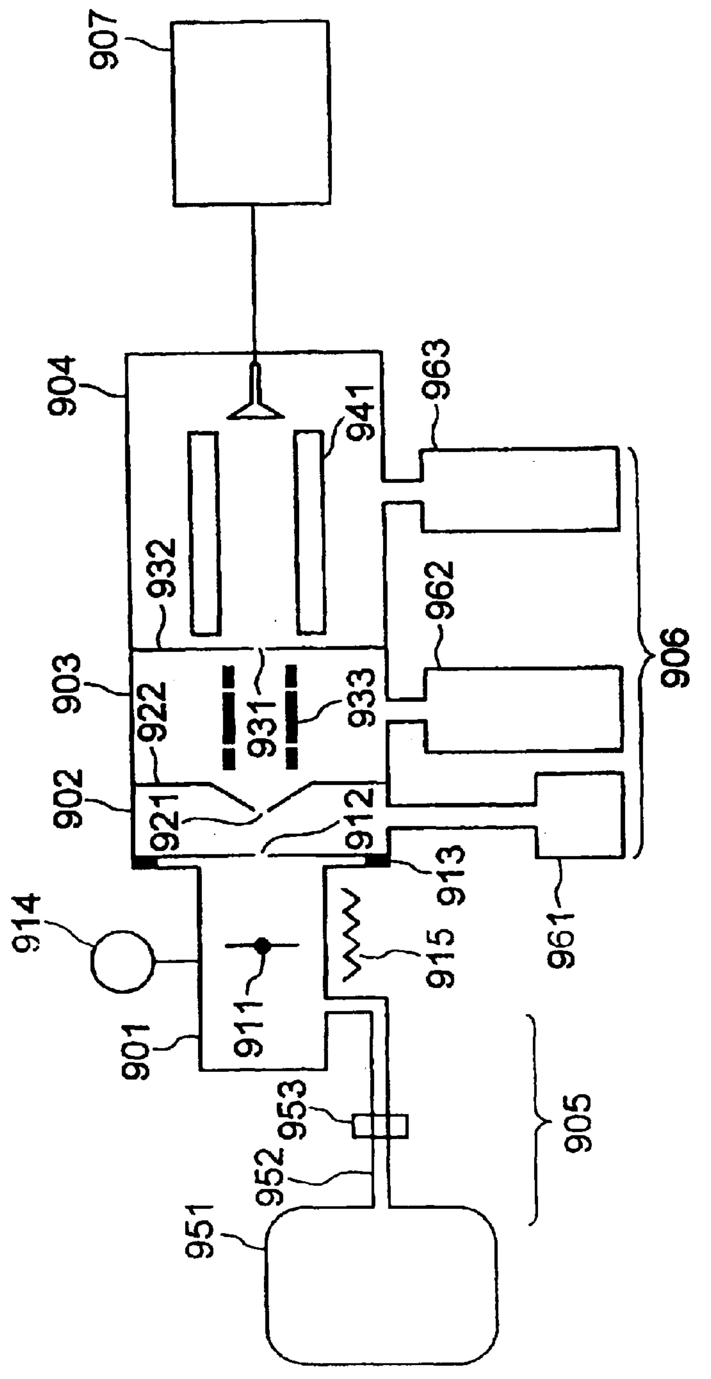
FIG. 9 is a view of the configuration of a first example of an ion attachment mass spectrometry apparatus of the related art (Fujii)
Figure 10:
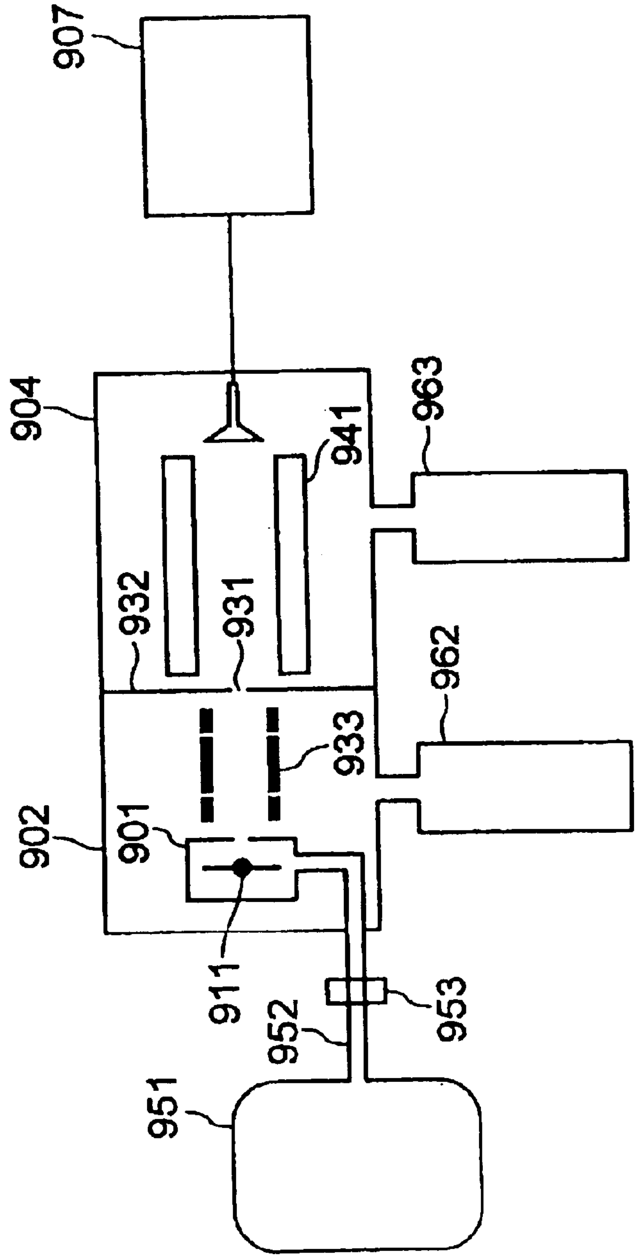
FIG. 10 is a view of the configuration of a second example of an ion attachment mass spectrometry apparatus of the related art (Bombick)
Figure 11:
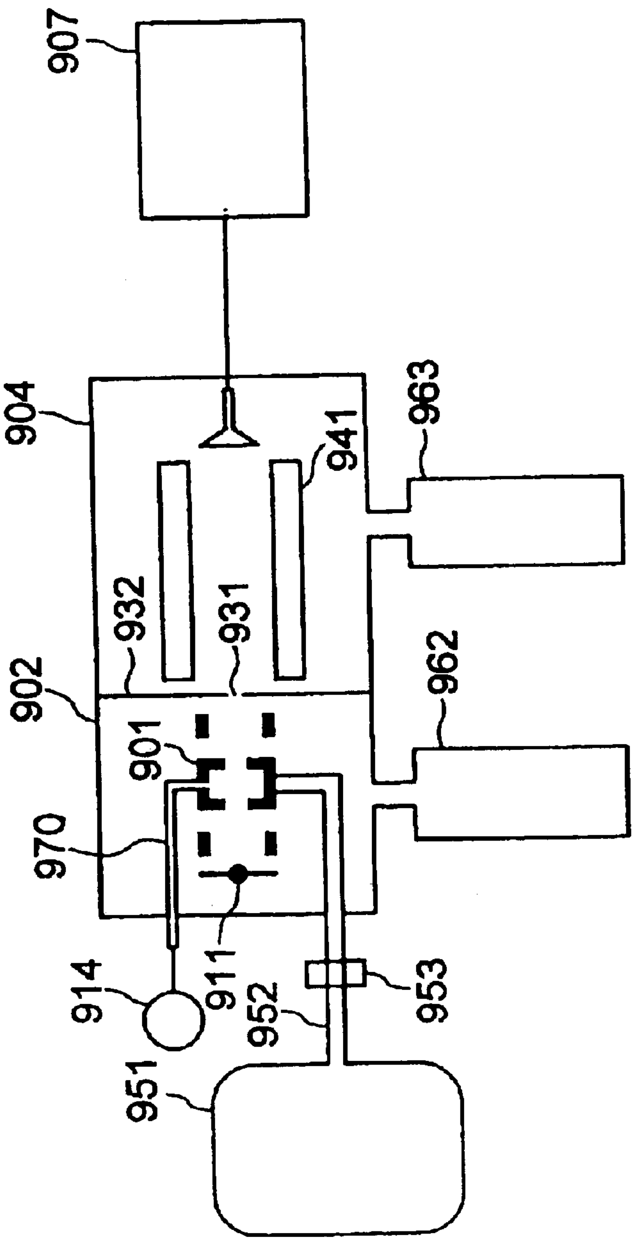
FIG. 11 is a view of the configuration of a third example of an ion attachment mass spectrometry apparatus of the related art (Hodges).

A sixth embodiment of the ion attachment mass spectrometry apparatus according to the present invention will be explained next with reference to FIG. 8. The basic configuration is substantially the same as that of the fourth embodiment. The characterizing part of the configuration is that the reaction chamber 11 is the same as that of the second example of the related art mentioned above and is installed in the first differential evacuation chamber 12. Further, the vacuum gauge is not directly attached in the reaction chamber 11. The conductance between the reaction chamber 11 and the first differential evacuation chamber 12 and the pumping speed of the first differential evacuation chamber dry pump 76 are known, so the correlation between the total pressure of the first differential evacuation chamber 12 due to the first differential evacuation chamber dry pump 76 and the total pressure of the reaction chamber 11 can be found from these values. Note that the vacuum pump for evacuating the first differential evacuation chamber 12 is not a composite type, but a first differential evacuation chamber dry pump 76 in the same way as the third embodiment.

The operation in the sixth embodiment is generally the same as the operation of the fourth embodiment. The characteristic part of the operation consists of confirming if the total pressure of the reaction chamber 11 exceeds the allowable fluctuation of total pressure during measurement by setting the contact signal 33 of the first differential evacuation chamber vacuum gauge 33 to an allowable fluctuation of total pressure of the first differential evacuation chamber 12 corresponding to the allowable fluctuation of total pressure of the reaction chamber obtained from the above correlation. By this, an error signal is obtained from the first differential evacuation chamber vacuum gauge 33.

The above embodiments may be modified in the following manner.

In the second to sixth embodiments, only an error signal was sent from the vacuum gauge 24 to the data processor 17, but the invention is not limited to this. It is also possible to send a fine total pressure signal and have the data processor 17 perform the quantitative calculations. In the fourth and fifth embodiments, feedback control of the total pressure was not performed, but it is also possible to insert a conductance modulating adjustment valve in the pipe connecting the reaction chamber 11 and the dry pump 313 and perform feedback control of the total pressure of the reaction chamber 11 by the same method as the feedback control of the first differential evacuation chamber in the second embodiment. In the sixth embodiment, feedback control of the total pressure was not performed, but it is also possible to send a detailed total pressure signal from the first differential evacuation chamber vacuum gauge 33 to the gas introduction mechanisms and perform feedback control of the total pressure of the reaction chamber 11 for various modifications or combinations in accordance with need.

In the first embodiment and second embodiment, the first differential evacuation chamber vacuum gauge 33 was provided, but this may also be omitted. This is because, in actual measurement, the conductance of the first aperture 22 and the pumping speed of the second differential evacuation chamber dry pump 77 are constant, so there is little need to consider the individual dependency of the first differential evacuation chamber 12. Further, for simplification of the apparatus, by making the first aperture 22 smaller, even with some sacrifice to the sensitivity, it is possible to omit the first differential evacuation chamber 12 itself. That is, it is possible to make the chambers only the reaction chamber 11 and the analysis chamber 14 and possible to provide one or more differential evacuation chambers between them.

In the above embodiments, the preliminary measurement for finding the dependency on total pressure of the sensitivity was performed right before the actual measurement, but the invention is not limited to this. It is also possible to find the dependency on total pressure of the sensitivity considerably in advance for components expected to be measured in the future. Further, it is also possible not to perform the preliminary measurement on the same apparatus, but to use data on the dependency on total pressure of the sensitivity obtained by another apparatus of the same type. This is because the mechanism of dependency on total pressure of the sensitivity is not that related to the aging or deterioration of an apparatus or the differences between apparatuses of the same type.

In the above embodiments, the quantitative values were calculated during the measurement, but the invention is not limited to this. Note that in this case, it becomes possible to perform the preliminary measurement after the actual measurement.

In the above embodiments, there was one data processor 17 directly connected to the mass spectrometer, but the invention is not limited to this. It is also possible to divide the data processor into a plurality of units and possible to not directly connect it to the mass spectrometer, but input the data by some means or another.

In the above embodiments, the dependency on total pressure was considered, but when finding the sensitivity more precisely, it is also possible to consider the dependency on the partial pressure, not just the total pressure. This is achieved by changing the temperature and finding the sensitivity at each when introducing a gas of a known concentration and specific component into the detection space in the preliminary measurement. The technique for correcting the sensitivity when it is not constant with respect to an amount of presence corresponds to the well known calibration curve method. In the conventional calibration curve method, however, it is assumed that there are no changes in sensitivity due to the total pressure, but the present invention differs in that the sensitivity or calibration curve are grasped as distinctive quantities at a specific total pressure.

In the above embodiments, three types of gas introduction mechanisms (FIGS. 1 and 4, FIG. 5, and FIGS. 6 to 8), three types of total pressure correction methods (FIG. 1, FIGS. 4 and 5, and FIGS. 6 to 8), six types of evacuation mechanisms (FIG. 1, FIG. 4, FIG. 5, FIG. 6, FIG. 7, and FIG. 8), and two types of mass spectrometers (FIGS. 1, 4, 5, 6, and 8 and FIG.

7) were shown, but the combinations of these are not limited to those shown in the embodiments. Any combination is possible. Further, it is possible to combine gas introduction mechanisms, total pressure correction methods, evacuation mechanisms, and mass spectrometers other than those shown here as well.

In the above embodiments, the reaction chamber 11 was made a streamlined type with no small depressions or corners, the surface of the inside walls was polished, immobilized, and precise washed, a metal-based material was used for the reaction chamber seal 23, the pipe 62 was attached to the upstream-most part of the reaction chamber, and the reaction chamber vacuum gauge 24 and differential evacuation chamber vacuum gauge 33 were made diaphragm type vacuum gauges. Not all of these are necessarily essential, however. It is possible to selectively employ these features in accordance with the object of analysis. Further, the reaction chamber 11 does not necessarily have to be a streamlined type. It is sufficient that it be of a structure with no large or deep depressions or corners and with a flow which proceeds in a general smooth direction without remaining still much.

In the above embodiments, use was made of a turbo molecular pump, axial flow molecular pump, and screw groove pump, but the invention is not limited to this. It is also possible to use a membrane pump, scroll pump, ion pump, getter pump, and various other types of dry pumps.

In the above embodiments, use was made of the lightest $Li^+$ as the metal ions, but the invention is not limited to this. It is also possible to use $K^+$, $Na^+$, $Rb^+$, $Cs^+$, $Al^+$, $Ga^+$, $In^+$, etc. Further, as the mass spectrometer, use was made of a Q-pole type mass spectrometer and three-dimensional (3D) type mass spectrometer, but the invention is not limited to this. It is also possible to use a magnetic field sector type mass spectrometer, time-of-flight (TOF) type mass spectrometer, or ion cyclotron resonance (ICR) type mass spectrometer.

In the above embodiments, the explanation was given with reference to samples to be measured all in the gaseous state, but the samples themselves may also be solids or liquids. It is possible to convert solid or liquid samples to a gaseous state by some means or another and then analyze that gas. Further, the apparatus of the present invention may also be connected to another component separation apparatus, for example, a gas chromatograph or liquid chromatograph, for use as a gas chromatograph/mass spectrometer (GC/MS) or liquid chromatograph/mass spectrometer (LC/MS).

While the invention has been described with reference to specific embodiment chosen for purpose of illustration, it should be apparent that numerous modifications could be made thereto by those skilled in the art without departing from the basic concept and scope of the invention.

The present disclosure relates to subject matter contained in Japanese Patent Application No. 2000-169644, filed on Jun. 6, 2000, the disclosure of which is expressly incorporated herein by reference in its entirety.

What is claimed is:

1. A method of ion attachment mass spectrometry causing positively charged metal ions to attach to a gas to be detected in a reduced pressure atmosphere to ionize the gas for measurement of mass spectrometry, comprising:

a step of utilizing a property that sensitivity of each component of said gas has dependency on a total pressure of said reduced pressure atmosphere and that said dependency on the total pressure differs for each component, and a step of performing a quantitative analysis while using the total pressure data of said reduced pressure atmosphere measured on mass spectrometry for processing of mass spectrometry data of said each component;

wherein the total pressure of said reduced pressure atmosphere is set and maintained in a range from about 50 Pa to about 250 Pa.

2. A method of ion attachment mass spectrometry as set forth in claim 1, wherein a quantitative value is calculated for said each component using sensitivity corresponding to the total pressure during measurement.

3. A method of ion attachment mass spectrometry as set forth in claim 1, wherein the total pressure during the measurement is set within an allowable fluctuation of total pressure.

4. A method of ion attachment mass spectrometry causing positively charged metal ions to attach to a gas to be detected in a reduced pressure atmosphere to ionize the gas for measurement of mass spectrometry, comprising:

a step of utilizing a property that sensitivity of each component of said gas has dependency on a total pressure of said reduced pressure atmosphere and that said dependency on the total pressure differs for each component, and a step of performing a quantitative analysis while using the total pressure data of said reduced pressure atmosphere measured on mass spectrometry for setting measurement conditions for mass spectrometry of said each component;

wherein the total pressure of said reduced pressure atmosphere is set and maintained in a range from about 50 Pa to about 250 Pa.

5. A method of ion attachment mass spectrometry as set forth in claim 4, wherein a quantitative value is calculated for said each component using sensitivity corresponding to the total pressure during measurement.

6. A method of ion attachment mass spectrometry as set forth in claim 4, wherein the total pressure during the measurement is set within an allowable fluctuation of total pressure.

7. A method of ion attachment mass spectrometry causing positively charged metal ions to attach to a gas to be detected in a reduced pressure atmosphere to ionize the gas for measurement of mass spectrometry, comprising:

a step of utilizing a property that sensitivity of each component of said gas has dependency on a total pressure of said reduced pressure atmosphere and that said dependency on the total pressure differs for each component, and a step of performing a quantitative analysis while using the total pressure data of said reduced pressure atmosphere measured on mass spectrometry for processing of mass spectrometry data of said each component;

wherein the total pressure during the measurement is set within an allowable fluctuation of total pressure; and wherein the allowable fluctuation of total pressure is calculated for said each component using a rate of change of sensitivity corresponding to the total pressure during the measurement and a required quantitative error value.

8. An apparatus for ion attachment mass spectrometry for measurement of mass spectrometry provided with:

a reaction chamber for causing positively charged metal ions to attach to a gas to be detected;

a mass spectrometer for separating and detecting said gas to which the positively charged metal ions are attached;

an analysis chamber in which said mass spectrometer is placed;

an introduction mechanism for introducing gases containing said gas to be detected into said reaction chamber;

an evacuation mechanism for evacuating the gases containing said gas to be detected;

a data processor for receiving and processing a mass signal from said mass spectrometer;

wherein the measurement of mass spectrometry on said gas to be detected is performed after causing the positively charged metal ions to attach to said gas to be detected to ionize it through said reaction chamber and analysis chamber with a reduced pressure atmosphere;

further comprising a vacuum gauge for measuring a total pressure of said reduced pressure atmosphere;

wherein a total pressure signal from said vacuum gauge measured during the measurement is input to said data processor, and said data processor includes a processing means for performing a quantitative analysis of each component utilizing the fact that sensitivity of said each component has dependency on the total pressure of said reduced pressure atmosphere and that the dependency on total pressure differs for said each component; and wherein the total pressure of said reduced pressure atmosphere is set and maintained in a range from about 50 Pa to about 250 Pa.

9. An apparatus for ion attachment mass spectrometry as set forth in claim 8, further provided between said reaction chamber and said analysis chamber with a differential evacuation chamber of a reduced pressure atmosphere for connecting said two chambers in a vacuum state.

10. An apparatus for ion attachment mass spectrometry as set forth in claim 8, wherein said total pressure signal is input to said data processor and said data processing means of said data processor calculates a quantitative value of each component using sensitivity corresponding to said total pressure during the measurement and a mass signal.

11. An apparatus for ion attachment mass spectrometry for measurement of mass spectrometry provided with:

a reaction chamber for causing positively charged metal ions to attach to a gas to be detected;

a mass spectrometer for separating and detecting said gas to which the positively charged metal ions are attached;

an analysis chamber in which said mass spectrometer is placed;

an introduction mechanism for introducing gases containing said gas into said reaction chamber;

an evacuation mechanism for evacuating the gases containing said gas to be detected;

a data processor for receiving and processing a mass signal from said mass spectrometer;

wherein the measurement of mass spectrometry on said gas to be detected is performed after causing the positively charged metal ions to attach to said gas to ionize it through said reaction chamber and analysis chamber with a reduced pressure atmosphere;

further comprising a vacuum gauge for measuring a total pressure of said reduced pressure atmosphere;

wherein a total pressure signal from said vacuum gauge measured during the measurement is input to said introduction mechanism or said evacuation mechanism, and said data processor performs a quantitative analysis of said each component, and wherein an allowable fluctuation of total pressure is calculated for said each component using a rate of change of sensitivity corresponding to the total pressure during the measurement and a required quantitative error value.

12. An apparatus for ion attachment mass spectrometry as set forth in claim 11, wherein said total pressure signal is input to said introduction mechanism or said evacuation mechanism, and said introduction mechanism or said evacuation mechanism is controlled using said total pressure signal so that the total pressure of said reduced pressure atmosphere becomes within the allowable fluctuation of total pressure.

13. An apparatus for ion attachment mass spectrometry as set forth in claim 12, wherein said total pressure signal is input to said data processor, and said data processor uses said total pressure signal to monitor that the total pressure of said reduced pressure atmosphere is within the allowable fluctuation of total pressure.

14. An apparatus of ion attachment mass spectrometry as set forth in claim 13, wherein the allowable fluctuation of total pressure is calculated by the data processor from a rate of change of sensitivity corresponding to the total pressure of said reduced pressure atmosphere during the measurement and a required quantitative error value.

15. An apparatus for ion attachment mass spectrometry as set forth in claim 12, wherein the allowable fluctuation of total pressure is calculated by the data processor from a rate of change of sensitivity corresponding to the total pressure of said reduced pressure atmosphere during the measurement and a required quantitative error value.

16. An apparatus of ion attachment mass spectrometry as set forth in claim 11, further provided between said reaction chamber and said analysis chamber with a differential evacuation chamber of a reduced pressure atmosphere for connecting said two chambers in a vacuum state.

* * * * *